(12) United States Patent
Föhrenbach et al.

(10) Patent No.: US 10,166,691 B2
(45) Date of Patent: Jan. 1, 2019

(54) HAND-GUIDED POWER TOOL WITH A GUIDE BAR

(71) Applicant: Andreas Stihl AG & Co. KG, Waiblingen (DE)

(72) Inventors: Jan Föhrenbach, Fellbach (DE); Klaus-Martin Uhl, Plochingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 11 days.

(21) Appl. No.: 15/406,857

(22) Filed: Jan. 16, 2017

(65) Prior Publication Data
US 2017/0210027 A1   Jul. 27, 2017

(30) Foreign Application Priority Data

Jan. 23, 2016 (DE) .................. 10 2016 000 718

(51) Int. Cl.
| | |
|---|---|
| *B27B 17/12* | (2006.01) |
| *B27B 17/02* | (2006.01) |
| *B27B 17/14* | (2006.01) |
| *A01G 3/08* | (2006.01) |
| *A01G 3/033* | (2006.01) |

(52) U.S. Cl.
CPC .............. *B27B 17/12* (2013.01); *A01G 3/033* (2013.01); *A01G 3/086* (2013.01); *B27B 17/02* (2013.01); *B27B 17/14* (2013.01)

(58) Field of Classification Search
CPC ........ A01G 3/033; A01G 3/086; B27B 17/02; B27B 17/12; B27B 17/14
See application file for complete search history.

(56) References Cited

U.S. PATENT DOCUMENTS

| | | | | |
|---|---|---|---|---|
| 3,578,779 | A * | 5/1971 | Ishizaki | .................. B27B 17/02 |
| | | | | 30/123.4 |
| 3,581,783 | A * | 6/1971 | Sandin | ..................... B27B 17/12 |
| | | | | 30/123.4 |
| 4,819,332 | A | 4/1989 | Sugihara et al. | |
| 5,634,273 | A * | 6/1997 | Michels | ................ B27B 17/025 |
| | | | | 30/123.4 |
| 5,653,028 | A | 8/1997 | Hashimoto | |

(Continued)

FOREIGN PATENT DOCUMENTS

| | | |
|---|---|---|
| DE | 19547353 | 8/1996 |
| EP | 3 195 721 A3 * | 8/2017 |

*Primary Examiner* — Hwei C Payer
(74) *Attorney, Agent, or Firm* — Gudrun E. Huckett

(57) ABSTRACT

A power tool has a sprocket wheel cover mounted on a housing and a guide bar secured between housing and sprocket wheel cover and having a guide groove for a saw chain. The guide bar has a guide slot extending in a longitudinal direction of the guide bar and guiding the guide bar on a guide element for longitudinal movement relative to the housing. The guide bar has a first exterior side extending in a first plane and facing the housing and a second exterior side extending in a second plane and facing the sprocket wheel cover. The guide bar has an oil supply opening extending from the second exterior side into the guide groove and connected by an oil supply channel with an oil supply device. The oil supply channel has a channel section separate from the guide bar and extending from the first to the second plane.

14 Claims, 8 Drawing Sheets

(56) References Cited

U.S. PATENT DOCUMENTS

| | | | | |
|---|---|---|---|---|
| 5,718,050 A * | 2/1998 | Keller | ...................... | A01G 3/08 |
| | | | | 16/DIG. 12 |
| 5,896,669 A | 4/1999 | Uhl | | |
| 8,136,256 B2 * | 3/2012 | Wolf | ....................... | B27B 17/02 |
| | | | | 30/381 |
| 8,615,889 B2 * | 12/2013 | Martinsson | ............. | B27B 17/14 |
| | | | | 30/383 |
| 8,869,787 B2 * | 10/2014 | Tholking | ................ | B27B 17/02 |
| | | | | 125/12 |
| 9,138,912 B2 * | 9/2015 | Kapinsky | ............. | B23D 59/006 |
| 9,573,208 B2 * | 2/2017 | Takayanagi | .......... | B23D 57/023 |
| 2008/0034597 A1 * | 2/2008 | Pfleiderer | .............. | B27B 17/02 |
| | | | | 30/382 |
| 2017/0210027 A1 * | 7/2017 | Fohrenbach | ........... | A01G 3/086 |

\* cited by examiner

HAND-GUIDED POWER TOOL WITH A GUIDE BAR

BACKGROUND OF THE INVENTION

The invention relates to a hand-guided power tool comprising a guide bar. The guide bar is held between a housing and a sprocket wheel cover of the power tool and comprises a guide groove for a saw chain. The guide bar further comprises a guide slot extending in the direction of a longitudinal center axis of the guide bar, wherein the guide bar is guided by means of the guide slot to be longitudinally slidable relative to the housing on at least one guide element. The guide bar comprises a first exterior side facing the housing and a second exterior side facing the sprocket wheel cover, wherein the first exterior side is positioned in a first plane and wherein the second exterior side is positioned in a second plane. The power tool further comprises an oil supply device.

U.S. Pat. No. 5,896,669 discloses a hand-guided power tool in the form of a pole pruner. The pole pruner comprises a cutting head on which a guide bar is to be secured. For lubricating the saw chain which is circulating about the guide bar, an oil pump is provided that supplies oil from an oil tank through an oil channel to an oil groove in a fastening flange. In operation, the guide bar is resting against the fastening flange. Relative to the usual working position of the power tool, the fastening flange is arranged on the right side of the cutting head. In this way, the cutting location can be viewed in operation by the operator without the cutting head obstructing the view.

The exterior side of the guide bar which is resting against the fastening flange comprises usually an oil supply opening which is positioned opposite the oil groove of the fastening flange and which extends from the exterior side into the guide groove. Through the oil supply opening, oil is supplied into the guide groove of the guide bar. In order for the guide bar to be reversible, oil supply openings are usually arranged on both exterior sides of the guide bar. The oil supply is realized exclusively through the oil supply opening which is arranged on the side which is facing the fastening flange. The oil supply opening which is supplying the oil is usually positioned above a longitudinal center axis of the guide bar so that the oil is transported by the saw chain in the direction of the tip of the guide bar.

In order to improve unobstructed viewing of the guide bar in operation, it is desirable that the fastening flange for the guide bar is arranged on the side of the cutting head which is positioned to the left in operation so that the cutting head obstructs only minimally the view of the guide bar in the usual working position.

In conventional motor chainsaws, the guide bar contact surface is arranged on the right side of the motor chainsaw. At the exterior side with which the guide bar is resting against the housing of the motor chainsaw, the guide bar comprises an oil supply opening for supply of oil into the guide bar. It is desirable that the guide bars of conventional motor chainsaws can be used even in power tools in which the guide bar contact surface is positioned on the opposite left side and that the oil supply can be realized through the same oil supply opening.

The invention has the object to provide a hand-guided power tool of the aforementioned kind on which guide bars can be mounted in which an oil supply opening is arranged on the side which is facing away from the housing of the power tool.

SUMMARY OF THE INVENTION

This object is solved by a power tool in which the guide bar has an oil supply opening which is extending from the second exterior side of the guide bar into the guide groove, wherein the oil supply opening is connected fluidically by an oil supply channel with the oil supply device, and wherein the oil supply channel comprises a channel section which is embodied as a part separate from the guide bar and which extends at least from the first plane to the second plane.

It is provided that the oil supply channel, which connects the oil supply opening in the guide bar with an oil supply device, comprises a channel section which is embodied as a part separate from the guide bar and which extends at least from a first plane, which contains the exterior side of the guide bar facing the housing, to a second plane, which comprises the exterior side of the guide bar that is facing the sprocket wheel cover. The channel section extends thus at least across the width of the guide bar between the housing and the sprocket wheel cover. Since the channel section is embodied as a part separate from the guide bar, the channel section can be arranged stationarily relative to the housing. In this way, the channel section does not move when the saw chain is tensioned and, for tensioning, the guide bar is moved relative to the housing and relative to the sprocket wheel cover. Accordingly, sealing of the channel section is simplified. The channel section is decoupled from the relative movement of the guide bar relative to the housing. By means of the channel section, in a simple way oil can be supplied from the housing to the side of the guide bar which is facing the sprocket wheel cover and from there through the oil supply opening into the guide groove of the guide bar. In this way, lubrication of the saw chain is possible in a simple way. In this context, guide bars can be used in which the oil supply opening is provided on the side which is facing away from the housing. Despite the changed position of the fastening flange, the oil supply is realized through the oil supply opening of the guide bar through which the oil supply would be realized also in case of the conventional position of the fastening flange.

A preferred arrangement of the channel section results when the longitudinal center axis of the guide bar intersects the channel section. The channel section is therefore arranged in the area of the longitudinal center axis of the guide bar. Particularly preferred, the channel section extends through a guide slot of the guide bar. In this way, a compact arrangement with short paths for the oil is achieved so that a reliable lubrication action results.

A simple configuration is achieved when the channel section is formed at least partially in an extension which is projecting into a receptacle. The oil supply channel extends thus through the receptacle. When removing the sprocket wheel cover from the housing, the extension is advantageously pulled out of the receptacle. In this way, the sprocket wheel cover can be removed in a simple way from the housing and the oil supply channel is separated between the oil supply device and the oil supply opening of the guide bar.

By insertion of an extension into a receptacle, a separable connection in the oil supply channel can be achieved in a simple way.

The extension and the receptacle are advantageously sealed relative to each other by a seal. In this context, the seal can be configured as a separate sealing element arranged between the extension and the receptacle. Particularly preferred, the seal is configured as a sealing surface which is immediately formed between the extension and the receptacle, wherein the receptacle and the extension are resting against each other at the sealing surface. Preferably, the seal is arranged about the circumference of the extension. The seal is thus a seal which is acting in radial direction. In this way, a reliable sealing action, in particular across a comparatively large sealing surface, can be achieved. Because the sealing action is realized at the periphery, the sealing action is substantially independent of the relative position of extension and receptacle relative to each other; the relative position is different for guide bars of different thickness, for example.

A simple and safe sealing action can be achieved when the seal is arranged stationarily relative to the housing for displacement of the guide bar relative to the housing. The seal therefore does not move relative to the housing upon displacement of the guide bar, i.e., when tensioning the saw chain. Since extension and receptacle upon removal of the sprocket wheel cover are pulled apart from each other, a sealing partner of the seal is moved only upon attachment or removal of the sprocket wheel cover.

In order to enable a simple attachment and removal of the sprocket wheel cover, it is advantageously provided that the seal is arranged between the second plane and an exterior side of the sprocket wheel cover which is facing away from the housing. When the guide bar is placed onto the housing, a sealing partner or an element that is carrying a separate seal therefore projects through the area between the first and the second planes to the side of the guide bar which is facing away from the housing.

It can be provided that the receptacle is arranged on the housing and the extension on the sprocket wheel cover. In case of an arrangement on the sprocket wheel cover, the extension can also project to the first plane on the housing or project into the housing. However, it can be advantageous that the receptacle projects at least to the second plane.

Also, an arrangement in which the receptacle as well as the extension project into the area between the two planes can be advantageous. Alternatively, it can also be provided that the receptacle is arranged on the sprocket wheel cover and the extension on the housing. In this configuration, the extension can project to the second plane on the sprocket wheel cover or project into the sprocket wheel cover. Also, when arranging the receptacle on the sprocket wheel cover, the receptacle as well as the extension can project into the area between the two planes.

Advantageously, the receptacle is a sleeve. The sleeve is in particular a metallic sleeve. A sleeve of plastic material can however be advantageous also. The extension is advantageously formed by a guide element. The channel section is preferably configured as a through opening in the guide element. The guide element is in particular a guide bolt. In this context, the extension is preferably fixed on the housing and the sleeve is fixed on the sprocket wheel cover. This enables the use of a guide element as an extension.

A simple oil supply into the side of the guide bar facing away from the housing is realized when in the sprocket wheel cover an oil supply slot is formed which is arranged opposite the oil supply opening of the guide bar. The oil supply slot extends advantageously across a length which corresponds at least to the usual adjusting travel of a guide bar relative to the housing. In this way, in any position of the guide bar an oil supply from the oil supply slot into the oil supply opening of the guide bar can be ensured. Accordingly, since the channel section is embodied as a part separate from the guide bar and advantageously is not moved together with the guide bar, the oil supply slot preferably is the only location of the oil supply channel whose sealing surfaces carry out a relative movement relative to each other upon adjustment of the position of the guide bar relative to the housing. It can be advantageous to completely close the oil supply channel about its entire circumference across all further areas so that a closed channel results. A simple configuration is however achieved when the channel section is connected to the oil supply slot by a connecting channel which is open relative to the guide bar contact surface of the sprocket wheel cover. Such a connecting channel can be integrated in a simple way, in particular upon manufacture of the sprocket wheel cover by injection molding, in the form of a groove on the sprocket wheel cover. The connecting channel is sealed by means of the exterior side of the guide bar that is facing the sprocket wheel cover.

The power tool comprises advantageously a tensioning device. The tensioning device serves in particular for tensioning the saw chain. The guide bar comprises a transverse plane which contains the longitudinal center axis of the guide bar and is positioned perpendicular to the flat sides of the guide bar. The oil supply slot and the tensioning device are preferably arranged on opposite sides of the transverse plane. This results in a compact configuration. Preferably, the oil supply slot is arranged in the area of the upper run of the saw chain (the upper run is running toward the free end of the guide bar) and the tensioning device is arranged in the area of the lower run of the saw chain (the lower run is running from the free end of the guide bar toward the drive pinion). Also, the oil supply opening where the oil supply channel ends is advantageously arranged in the area of the upper run of the saw chain.

Advantageously, at least two guide elements are provided for the guide bar. A second guide element is advantageously formed as a guide bolt and comprises an outer thread for screwing on a fastening nut for fixation of the sprocket wheel cover. The second guide element comprises advantageously a greater length than the first guide element that forms the extension. In this context, the length of the guide elements is measured perpendicular to the first plane and measured all the way to the first plane. The power tool is advantageously a pole pruner and the housing is a gear housing. The power tool is preferably a power tool in which the contact surface of the housing against which the guide bar is resting is arranged on the left side of the housing in a viewing direction from the housing to the free end and in the usual operating position in which the saw chain is moving along the upper run to the free end and along the lower run back to the drive pinion.

Preferably, the housing and the extension are components that are embodied as parts separate from each other and that are connected fixedly with each other. Housing and extension can be advantageously produced of different materials. The extension is in particular exchangeable. The separate configuration of housing and extension is in particular advantageous when the extension forms a guide element for the guide bar. In alternative configuration it can also be advantageous to form the extension as a unitary part (one piece) together with the housing or with the sprocket wheel cover. In particular, a one-piece configuration as an injection-molded part is advantageous.

BRIEF DESCRIPTION OF THE DRAWING

Embodiments of the invention will be explained in the following with the aid of the drawings.

DESCRIPTION OF THE PREFERRED EMBODIMENTS

Figure 1:
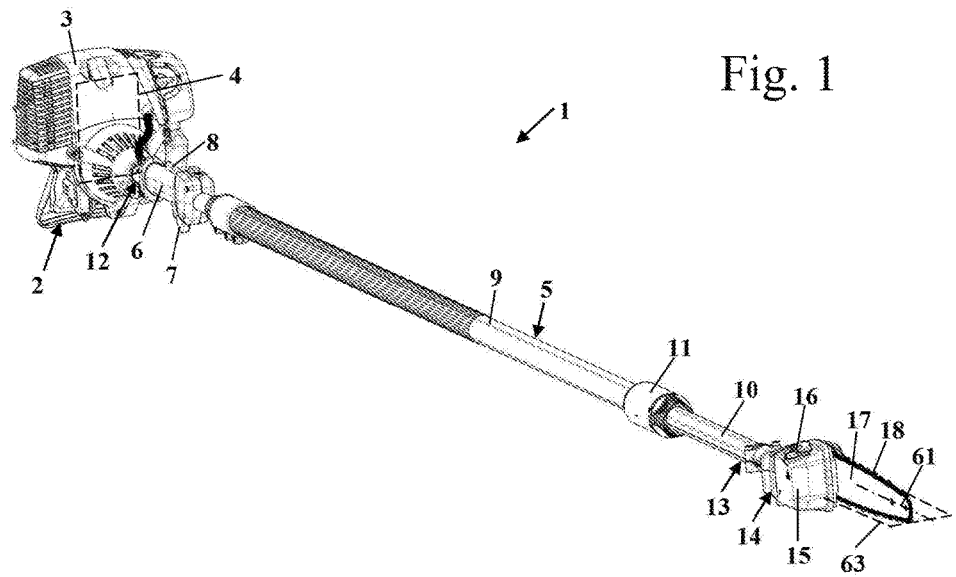
FIG. 1 is a partially schematic perspective illustration of a pole pruner.

FIG. 1 shows a pole pruner 1 as an embodiment of a hand-guided power tool. However, the hand-guided power tool can also be any other hand-guided power tool with a guide bar, for example, a motor chainsaw. The pole pruner 1 comprises a drive unit 2 that is connected by a guide tube 5 to the cutting head 14. The drive unit 2 comprises a housing 3 in which a drive motor 4, schematically illustrated in FIG. 1, is arranged. The drive motor 4 is advantageously an internal combustion engine. However, the drive motor 4 can also be an electric motor. It can also be provided that the drive motor is arranged on the cutting head 14, in particular when the drive motor 4 is an electric motor. In this case, a battery pack for supply of the drive motor 4 with energy can be arranged in the housing 3 of the drive unit 2, for example.

The guide tube 5 comprises a first end 12 on which the drive unit 2 is secured. Adjacent to the first end 12, a grip 6 is secured on the guide tube 5 on which a throttle trigger 7 as well as a throttle lock 8 are supported. Further or other operating elements can be advantageously provided also.

In the embodiment, the guide tube 5 is designed as a telescoping tube and comprises a first external section 9 and a second internal section 10 projecting into the first external section 9. The two sections 9 and 10 are connected to each other by a fixation device 11. The guide tube 5 can however also be designed as a tube whose length is not adjustable. A drive shaft is extending advantageously through the guide tube 5. The guide tube 5 comprises a second end 13 that is formed on the second internal section 10 of the guide tube 5. The cutting head 14 is secured to the second end 13.

The cutting head 14 comprises an oil tank 15 which can be opened and closed by an oil tank closure 16. On the cutting head 14, a guide bar 17 is arranged on which the saw chain 18 is guided. The saw chain 18 is driven in circulation about the guide bar 17 by drive motor 4. The guide bar 17 comprises a longitudinal center axis 61 and a transverse plane 63. The transverse plane 63 is positioned perpendicular to the plane of the guide bar 17, or the first and second exterior sides of the guide bar 17, and contains the longitudinal center axis 61. The saw chain 18 thus intersects the transverse plane 63 only at the free end of the guide bar 17 as well as upon passing a sprocket wheel 55 (FIG. 6); the saw chain 16 is thus not positioned with its entire length in the transverse plane 63.

In the usual working position, the power tool is positioned on the right side of the user. In order to not obstruct the view of the cutting location in operation by the gear housing, the guide bar 17 is positioned on the left side of the cutting head 14 in viewing direction of the user.

Figure 2:
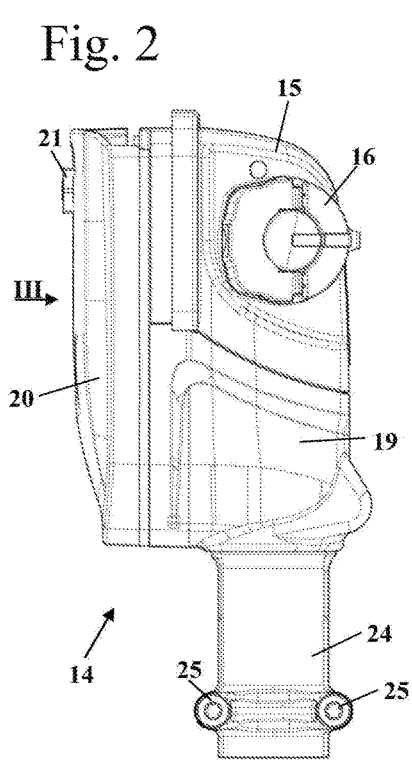
FIG. 2 is a plan view of a cutting head of the pole pruner.
Figure 3:
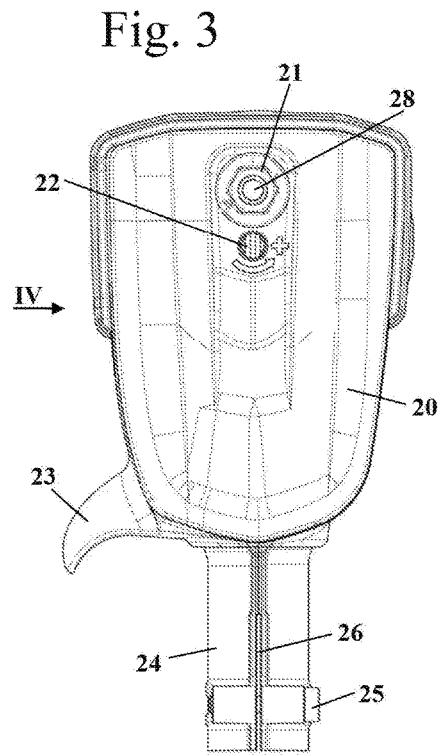
FIG. 3 is a side view in the direction of arrow III of FIG. 2.

FIG. 2 and FIG. 3 show the construction of the cutting head 14. As shown in FIG. 2, the cutting head 14 comprises a fastening socket 24 with which the cutting head 14 is clamped by means of screws 25 on the guide tube 5. As shown in FIG. 3, the fastening socket 24 comprises a longitudinal slot 26 which enables elastic deformation of the fastening socket 24.

As shown in FIG. 2, the cutting head 14 comprises a gear housing 19 on which the oil tank 15 is arranged. A sprocket wheel cover 20 is fixed by means of a fastening element, in the embodiment a fastening nut 21, on the gear housing 19. As shown in FIG. 3, the fastening nut 21 is screwed onto a guide bolt 28 of the gear housing 19. Adjacent to the fastening nut 21, an opening is provided in the sprocket wheel cover 20 through which a tensioning screw 22 of the tensioning device for the saw chain 18, to be described in more detail in the following, can be actuated. On the gear housing 19, a hook 23 is formed also which can prevent slipping of the cutting head 14 in operation. The hook 23 is also shown in FIG. 4.

Figure 6:
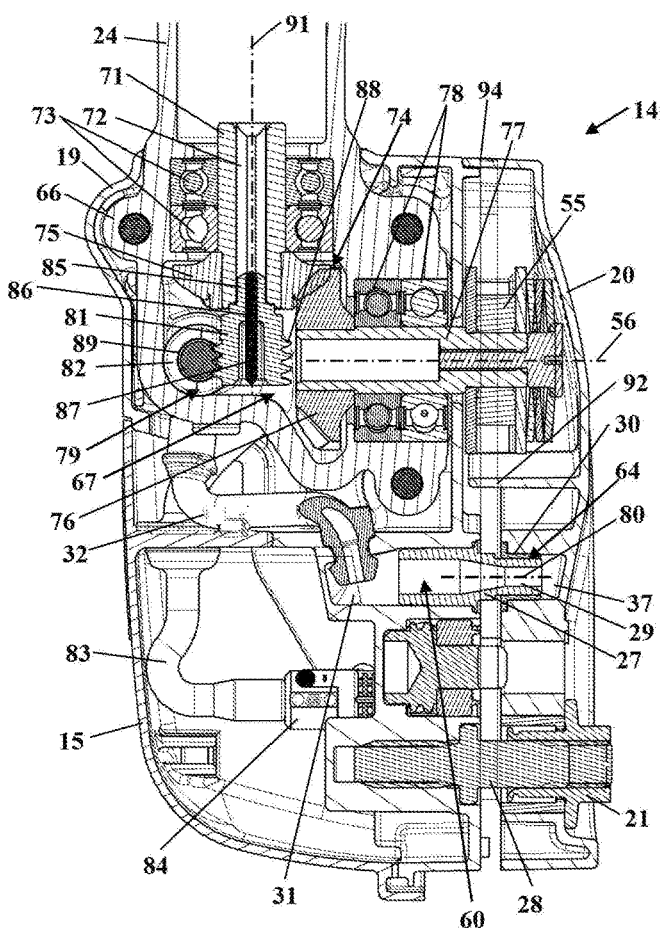
FIG. 6 is a section view of the cutting head along the line VI-VI of FIG. 5.
Figure 11:
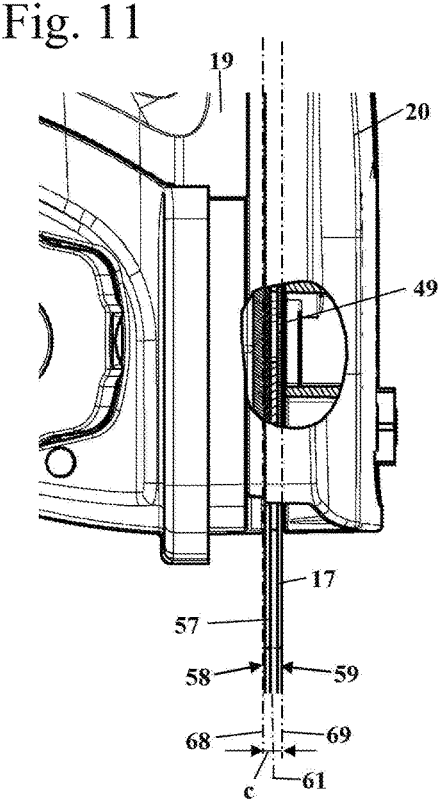
FIG. 11 is a partially sectioned view of the cutting head showing the area of the guide bar.

In operation, the saw chain 18 must be supplied with oil, in particular the run of the saw chain 18 (FIG. 1) that is running from the cutting head 14 to the free end of the guide bar 17. In the usual operating position, the run which is running from the cutting head 14 to the free end of the guide bar 17 is the upper run of the saw chain 18. For supplying oil, an oil supply device, in the embodiment an oil pump 79 shown in FIG. 6, is provided in the gear housing 19 and supplies oil from the oil tank 15 through a supply channel 60 to the guide bar 17 (FIG. 1). The guide bar 17 is not shown in FIG. 4. FIG. 4 however shows schematically a first plane 68 in which a first exterior side 58 of the guide bar 17 that is facing the gear housing 19 is positioned (see FIG. 11). Also, a second plane 69 is schematically indicated. In the second plane 69, the second exterior side 59 of the guide bar 17 is shown which is facing the sprocket wheel cover 20 and is illustrated in FIG. 11. A guide groove 57 in which the saw chain 18 (FIG. 1) is guided is extending centrally between the exterior sides 58 and 59.

Figure 4:
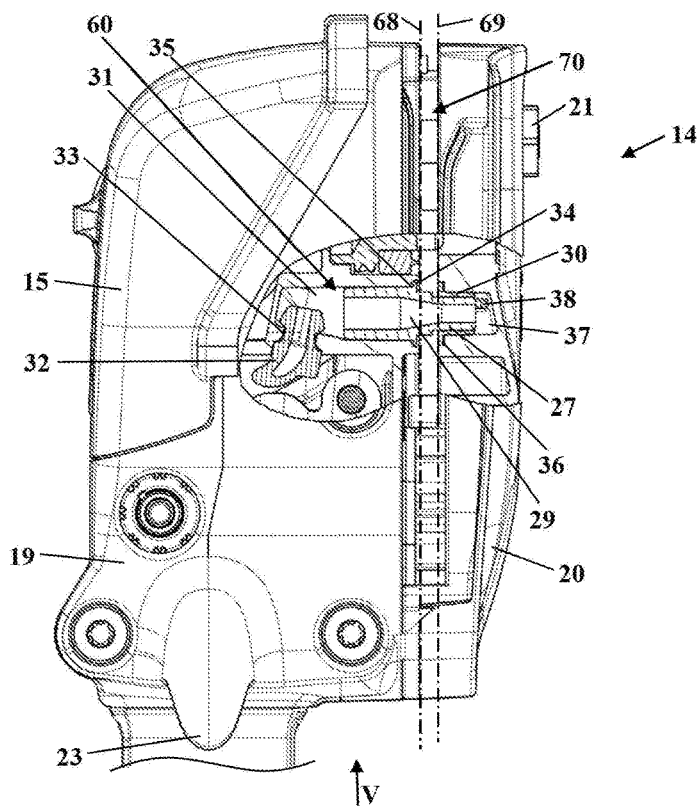
FIG. 4 is a partially sectioned side view in the direction of arrow IV of FIG. 3.

FIG. 4 shows a portion of the oil supply channel 60. The oil supply channel 60 refers in this context to the entire oil supply channel from the oil pump 79 (FIG. 6) to an oil supply opening in the guide bar 17. A section of the oil supply channel 60 is extending in a supply hose 32. The supply hose 32 comprises at its exterior circumference a constriction which in the embodiment is clipped in an opening 33 of a wall of the gear housing 19. The supply hose 32 opens into an oil space 31 which is also formed in the gear housing 19. In the embodiment, a first guide bolt 27 is pressed into the oil space 31. The guide bolt 27 forms an extension which is projecting away from the gear housing 19. The guide bolt 27 can be comprised of a material that is different from the material of the gear housing 19. It can be advantageous that the guide bolt 27 is secured exchangeably on the gear housing 19. The guide bolt 28 onto which the fastening nut 21 is screwed (FIG. 3) forms a second guide bolt. The first guide bolt 27 comprises a through opening which forms a channel section 29 of the oil supply channel 60. The free end of the first guide bolt 27 that is projecting away from the gear housing 19 is inserted into a sleeve 30 which is secured in the sprocket wheel cover 20. The sleeve 30 is also provided with a through opening. The channel section 29 opens into an oil space 37 which is formed in the sprocket wheel cover 20 and has a connecting channel 38 connected thereto that is extending away from the oil space 37. The connecting channel 38 will be described in the following in more detail. The oil space 37 and the connecting channel 38 form sections of the oil supply channel 60. The guide bolt 27 forms an extension and the sleeve 30 forms a receptacle.

As shown in FIG. 4, the guide bolt 27 comprises an outwardly projecting collar 34 which is resting against a stop 35 formed on the gear housing 19. Accordingly, the insertion depth of the guide bolt 27 is constructively predetermined. Adjacent to the second plane 69, i.e., on its side facing the guide bar 17, the sleeve 30 comprises an outwardly projecting collar 36 which limits the insertion depth of the sleeve 30 into the sprocket wheel cover 20 and ensures that the sleeve 30 cannot close off the connecting channel 38 which is beginning at the circumference of the oil space 37.

As shown in FIG. 4, between the planes 68 and 69 a gap 70 is formed through which the guide bar 17 projects out of the cutting head 14. The gap 70 extends only across a portion of the circumference of the cutting head 14.

Figure 5:
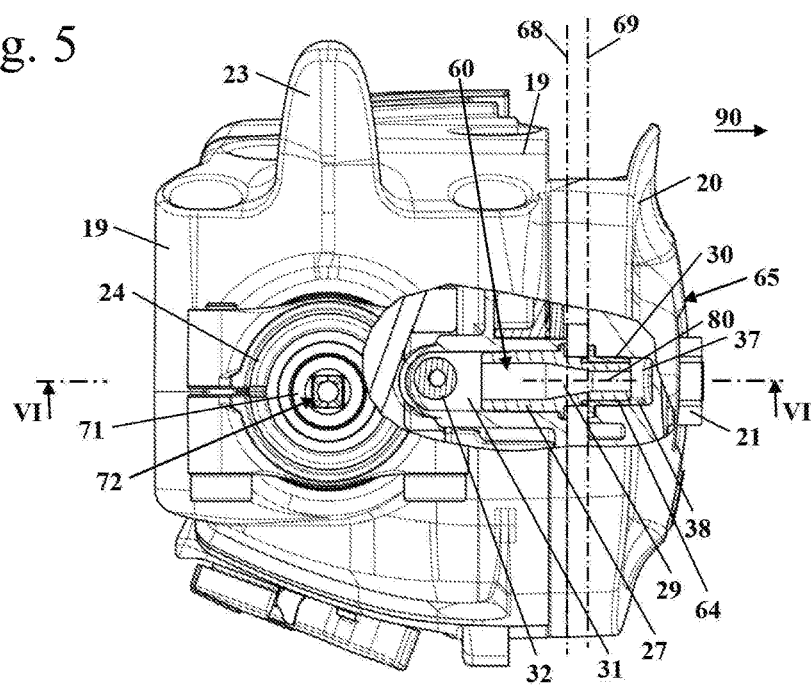
FIG. 5 is a partially sectioned side view in the direction of arrow V of FIG. 4.

As illustrated in FIG. 5, between the sleeve 30 and the first guide bolt 27 a seal 64 is formed. The seal 64 extends in longitudinal direction and in circumferential direction of a longitudinal axis 80 of the channel section 29. In the embodiment, the seal 64 is formed on a sealing surface where the sleeve 30 with its inner contour is contacting the exterior contour of the guide bolt 27. The sealing surface is cylindrical and is arranged on the outer circumference of the guide bolt 27. Since the seal 64 is a seal acting in circumferential direction and not at an end face, a reliable sealing action can be achieved in different positions of the sprocket wheel cover 20, for example, when arranging guide bars 17 of different thickness between the gear housing 19 and the sprocket wheel cover 20. By means of the seal 64 in a simple way a sealing action of the channel section 29 is achieved.

As is shown in FIG. 5, the seal 64 is arranged completely in the region between the second plane 69 and an exterior side 65 of the sprocket wheel cover 20 that is facing away from the gear housing 19. The seal 64 is located thus completely within the width of the sprocket wheel cover 20. The first guide bolt 27 is secured fixedly on the gear housing 19 and the sleeve 30 is fixedly secured on the sprocket wheel cover 20. When the guide bar 17 is displaced relative to the gear housing 19 and the sprocket wheel cover 20, in particular for tensioning the saw chain 18, the seal 64 does not move relative to the gear housing 19 and the sprocket wheel cover 20. Also, a movement in the sealing surface, i.e., a movement between sleeve 30 and guide bolt 27, does not take place. When removing the sprocket wheel cover 20, in particular for exchanging the guide bar 17 and/or the saw chain 18, the fastening nut 21 is loosened and the sprocket wheel cover 20 is detached in the direction of arrow 90 from the gear housing 19. In this context, the receptacle 30 is removed from the first guide bolt 27. The guide bolt 27 is thus pulled out of the receptacle 30.

As shown in FIG. 6, in the fastening socket 24 a drive element 71 is arranged that is provided on its inner circumference with a drive contour 72. The drive contour 72 in the embodiment is a square cross-section by means of which the drive moment of the drive motor 4 (FIG. 1) is transmitted from a drive shaft, not illustrated, to the drive element 71. The drive element 71 is supported with bearings 73, in the embodiment roller bearings, rotatably in an inner housing 66 arranged within the gear housing 19. The inner housing 66 is advantageously sealed relative to the environment and the interior 67 of the inner housing 66 is filled with fat or oil. The bearings 73 are provided with sealing discs for sealing. An input bevel gear 75 of an angular gear 74 is secured on the drive element 71. The drive element 71 together with the input bevel gear 75 is rotatable about an axis of rotation 91 which coincides with the longitudinal center axis of the guide tube 5 (FIG. 1) in the embodiment. The cutting head 14 comprises a sprocket wheel 55 that drives the saw chain 18 (FIG. 1). The sprocket wheel 55 is rotatable about axis of rotation 56 which is arranged transversely, in the embodiment perpendicularly, to the axis of rotation 91 of the drive element 71. The sprocket wheel 55 is fixed on an output shaft 77 which is supported with bearings 78 in the inner housing 66. The bearings 78 also comprise sealing discs. On its side which is projecting into the inner housing 66, the output shaft 77 supports an output bevel gear 76 which meshes with the input bevel gear 75 and together with it forms the angular gear 74.

The oil pump 79 is also arranged in the inner housing 66. The oil pump 79 is driven by a drive worm gear 81 that supports worm gear toothing 88. The worm gear toothing 88 meshes with an oil pump pinion toothing 89 of an oil pump pinion 82. The drive element 71 comprises a through opening which comprises the drive contour 72. In this way, the manufacture is simplified. The drive worm gear 81 comprises a connecting socket 85 which is inserted with one end into the opening of the drive element 71 and seals the interior 67 relative to the interior of the guide tube 5. As shown in FIG. 6, the drive worm gear 81 is supported only with one end on the drive element 71, i.e., is an overhung worm gear. This provides for a simple configuration.

The drive worm gear 81 comprises in the embodiment a through opening 86 into which a pin 87, in the embodiment a metal pin, is inserted. By means of the pin 87 the compression between drive element 71 and drive worm gear 81 can be increased.

FIG. 6 also shows an intake hose 83 that projects into the oil tank 15 and comprises a suction head 84 secured to its free end. The intake hose 83 supplies oil from the oil tank 15 to the oil pump 79. The intake hose 83 can be designed as a one-piece hose but it can also be advantageous to provide several hose sections that are connected to each other, in particular at a wall of the oil tank 15. The oil pump 79 forms the oil supply device of the cutting head 14. The oil supply channel 60 extends from the oil pump 79 to the guide bar 17. A section of the oil supply channel 60 is extending in the supply hose 32, also shown in FIG. 6, that opens in the oil space 31. By means of the channel section 29, the oil is guided from the oil space 31 to the side of the sprocket wheel cover 20, i.e., to the second exterior side 59 of the guide bar 17 (FIG. 7) which is facing the sprocket wheel cover 20.

Figure 7:
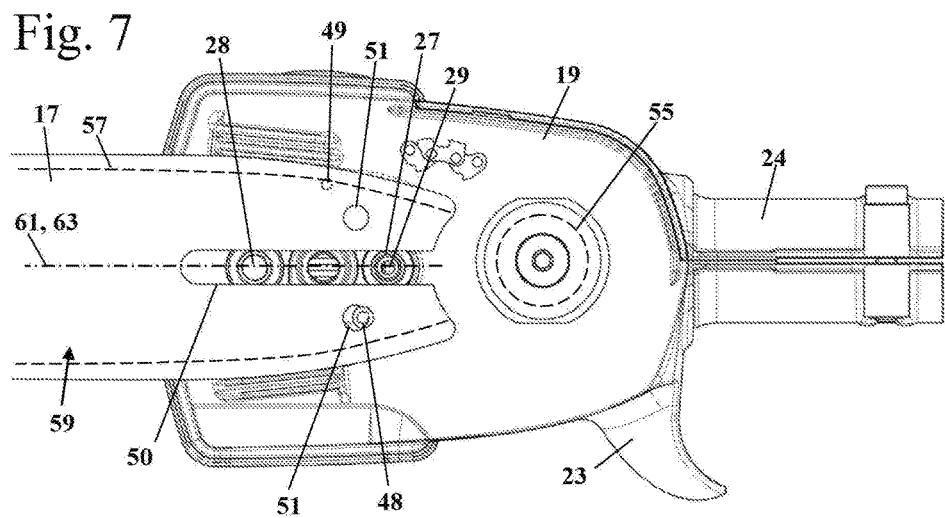
FIG. 7 is a side view of the housing of the cutting head with guide bar arranged thereat.

FIG. 7 shows the guide bar 17 on the gear housing 19. On its exterior side 59 which is facing away from the gear housing 19, the guide bar 17 comprises an oil supply opening 49 that extends to the guide groove 57. The oil supply opening 49 thus does not project across the entire width of the guide bar 17. Supply of oil from the side of the gear housing 19 is not possible. The oil supply opening 49 is arranged on the side of the transverse plane 63 on which the saw chain 18 (FIG. 1) is moving from the gear housing 19 to the free end of the guide bar 17. On both sides of the transverse plane 63 the guide bar 17 comprises tensioning openings 51. On the side of the transverse plane 63 which is arranged opposite the oil supply opening 49, a tensioning bolt 48 projects into the tensioning opening 51. At its end which is arranged on the gear housing 19, the guide bar 17 comprises a guide slot 50 which extends in the direction of the longitudinal center axis 61 and in which a section of the longitudinal center axis 61 is positioned. In the embodiment, the guide slot 50 is open toward the end that is facing the sprocket wheel 55. However, it can also be provided that the guide slot 50 is formed as a longitudinal slot which is closed off at both ends. The first guide bolt 27 and the second guide bolt 28 are projecting through the guide slot 50. Accordingly, the channel section 29 projects also through the guide slot 50. The guide slot 50 extends completely through the guide bar 17, i.e., across the entire thickness of the guide bar 17.

It can also be provided that the channel section 29 is arranged outside of the guide slot 50. It is particularly preferred that the channel section 29 is arranged such that the longitudinal center axis 61 of the guide bar 17 intersects the channel section 29. An arrangement in another area can however be advantageous also. It can be particularly advantageous to arrange the channel section 29 in an area in which the sprocket wheel cover 20 is resting immediately against the gear housing 19. Accordingly, the channel section 29 is then protected in operation. This protected arrangement can be, for example, provided in a rim area of the gear housing 19 near its exterior contour.

Figure 8:
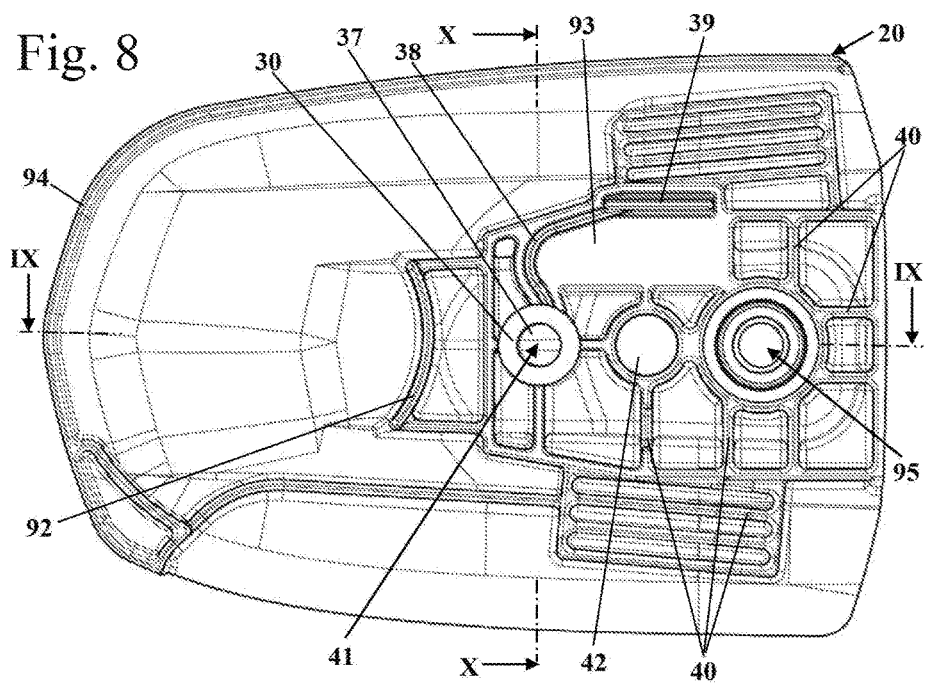
FIG. 8 is a side view of the sprocket wheel cover showing the side facing the housing.
Figure 9:
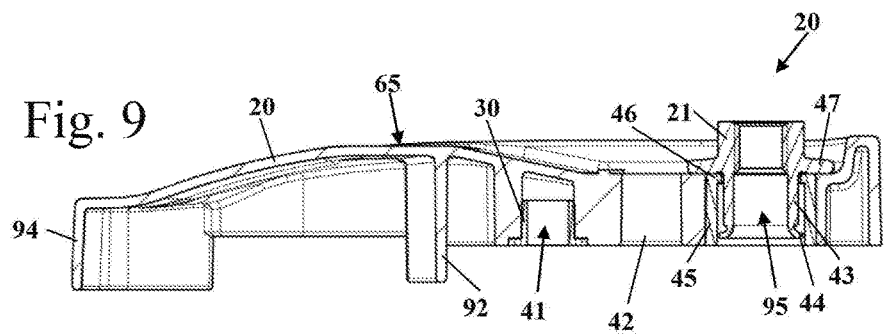
FIG. 9 is a section view along the line IX-IX of FIG. 8.
Figure 10:
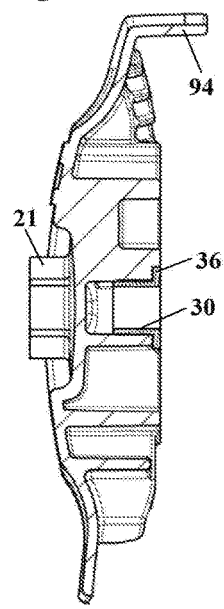
FIG. 10 is a section view along the line X-X of FIG. 8.

FIGS. 8 through 10 show the configuration of the sprocket wheel cover 20 in detail. FIG. 8 shows the side of the sprocket wheel cover 20 which is facing the gear housing 19 and the guide bar 17. The sprocket wheel cover 20 comprises an opening 95 for the second guide bolt 28. The sleeve 30 delimits an opening 41 for the first guide bolt 27. Between the openings 41 and 95, an opening 42 is arranged through which the tensioning screw 22 (FIG. 3) is accessible. As shown in FIG. 9, the opening 41 is of a closed configuration relative to the exterior side 65 of the sprocket wheel cover 20 (FIG. 9). The openings 42 and 95 are designed as through openings and extend completely through the sprocket wheel cover 20. On the sprocket wheel cover 20, an oil supply slot 39 is formed which is extending parallel to the longitudinal center axis 61 of the guide bar 17 (FIG. 7) and which is arranged opposite the oil supply opening 49 in the guide bar 17 (FIG. 7). The oil supply slot 39 forms the opening of the oil supply channel 60 at the guide bar 17 through which oil from the oil supply channel 60 is introduced into the oil supply opening 49 of the guide bar 17. Through the oil supply slot 39 oil is supplied to the oil supply opening 49. The oil supply slot 39 is connected by means of the connecting channel 38 with the oil space 37 at the bottom of the sleeve 30. The connecting channel 38 is also formed as an open slot that is open relative to the guide bar 17; it is sealed by the guide bar 17 and is in this way completed to a circumferentially completely closed channel section. At the opening 41, the oil space 37 is closed off by the sleeve 30 with the exception of a connecting opening where the connecting channel 38 begins.

It can be advantageous to design the boundary contour of at least one cross-section of the oil supply channel 60 of a multipart configuration at least over sections thereof. A particularly advantageous configuration results when the section of the oil supply channel 60 which is formed in the sprocket wheel cover 20 is delimited at least partially at one side by the second exterior side 59 of the guide bar 17. In the embodiment, the oil supply slot 39 and the connecting channel 38 are open toward a contact surface 93. In operation, the guide bar 17 with its second exterior side 59 (FIG. 7) is resting against the contact surface 93 and seals off the oil supply slot 39 and the connecting channel 38. The sealing action of surfaces that are moving relative to each other is relatively complex and prone to failure. The contact location between the oil supply slot 39 and the oil supply opening 49 is preferably the only location of the oil supply channel 60 whose sealing surfaces carry out a relative movement relative to each other upon movement of the guide bar 17. The channel section 29, on the other hand, is embodied as a part separate from the guide bar 17 and is not moved together with the guide bar 17 so that a sealing action of the channel section 29 can be designed constructively in a simple way and a reliable sealing action can be achieved.

In the embodiment, the contact surface 93 extends only between the oil supply slot 39 and the openings 41, 42, and 95. The sprocket wheel cover 20 comprises on the side which is projecting toward the guide bar 17 a plurality of support ribs 40 whose end faces are also resting against the guide bar 17. In this way, a uniform pressure of the sprocket wheel cover 20 acting on the guide bar 17 is achieved so that a good fixation results. On the side of the opening 41 which is facing away from the opening 95, a rib 92 is provided which is also shown in FIG. 9. The rib 92 projects to a location close to the gear housing 19. As shown in FIG. 6, the rib 92 extends in the area between the sprocket wheel 55 and the guide bolts 27 and 28. The rib 92 is of a curved design and extends adjacent to a section of the circumference of the sprocket wheel 55.

As shown in FIG. 9, the fastening nut 21 is secured captively in the opening 95. For this purpose, a sleeve 45 is provided in the sprocket wheel cover 20 and comprises at the side which is facing away from the gear housing 19 an inwardly projecting securing rim 46. The fastening nut 21 comprises a sleeve-shaped sleeve section 43 which is projecting into the sprocket wheel cover 20 and comprises at its end facing the gear housing 19 a securing rim 44 where the sleeve section 43 is bent outwardly. The securing rim 44 of the sleeve section 43 engages the securing rim 46 of the sleeve 45 and prevents that the fastening nut 21 can be detached from the sprocket wheel cover 20. As shown in FIG. 9, the fastening nut 21 comprises a collar 47 which is resting on the exterior side 65 of the sprocket wheel cover 20.

As shown in FIGS. 8 to 10, the sprocket wheel cover 20 has adjacent to the sprocket wheel 55 a circumferential rim 94 which projects toward the gear housing 19. This is also shown in FIG. 6. The circumferential rim 94 closes off the gap 70 (FIG. 4) formed between the gear housing 19 and the sprocket wheel cover 20 about a portion of the circumference of the cutting head 14.

FIG. 11 shows the guide bar 17 arranged between the gear housing 19 and the sprocket wheel cover 20. As shown in FIG. 11, the guide bar 17 comprises at its second exterior side 59, which is facing the sprocket wheel cover 20 and is facing away from the gear housing 19, the oil supply opening 49 which extends from the exterior side 59 into the guide groove 57. The planes 68 and 69 comprise a spacing c which corresponds to the thickness of the guide bar 17.

Figure 12:
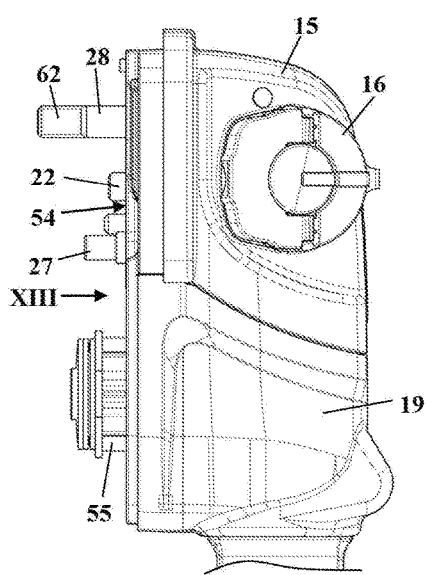
FIG. 12 is a side view of the housing of the cutting head.
Figure 13:
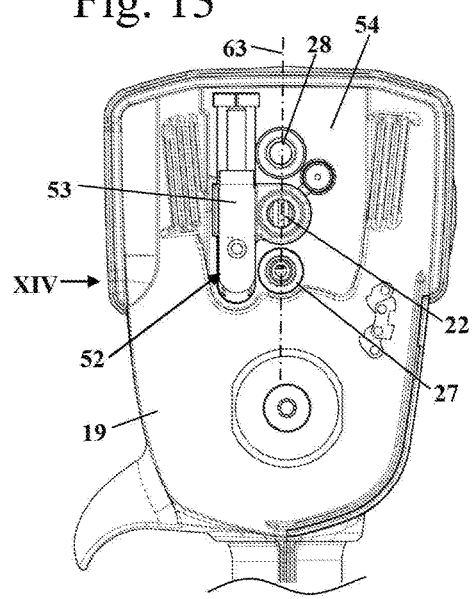
FIG. 13 is a side view in the direction of arrow XIII of FIG. 12.

As shown in FIG. 12, the second guide bolt 28 comprises an exterior thread 62 onto which the fastening nut 21 (FIG. 10) can be screwed. As shown in FIGS. 12 and 13, a support surface 54 for the guide bar 17 is formed on the gear housing 19. The support surface 54 is also comparatively small.

In FIG. 13, the transverse plane 63 of the guide bar 17 is schematically indicated. The transverse plane 63 extends through the longitudinal center axes of the guide bolts 27 and 28. On one side of the transverse plane 63, a tensioning device 52 is arranged. The tensioning device 52 comprises a tensioning member 53 which is slidable in the direction of the longitudinal center axis 61 (indicated in FIG. 11) of the guide bar 17 by rotation of the tensioning screw 22. The oil supply opening 49 (FIG. 11) and the tensioning device 52 are arranged substantially on opposite sides of the transverse plane 63. The support surface 54 formed on the gear housing 19 is positioned adjacent to the oil supply opening 49, i.e., also on the side of the transverse plane 63 which is opposite the tensioning device 52. Adjacent to the support surface 54, the guide bar 17 comprises the oil supply opening 49 which is illustrated in FIG. 11. A further oil supply opening is usually positioned adjacent to the tensioning device 52 so that the guide bar 17 can be secured on the gear housing 19 in two positions that are rotated relative to each other about the longitudinal center axis 61. The further oil supply opening arranged adjacent to the tensioning device 52 is arranged in the running direction of the saw chain 18 (FIG. 1) in advanced position relative to the sprocket wheel 55 (FIG. 12) so that an oil supply adjacent to the tensioning device 52 is not expedient. In operation, no oil is supplied through the further oil supply opening.

Figure 14:
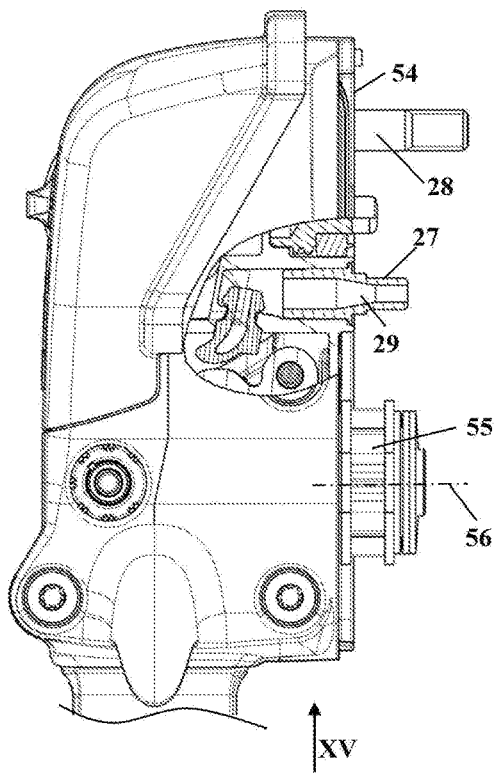
FIG. 14 is a partially sectioned side view in the direction of arrow XIV of FIG. 13.

FIG. 14 shows the arrangement of the support surface 54 and of the guide bolts 27 and 28.

Figure 15:
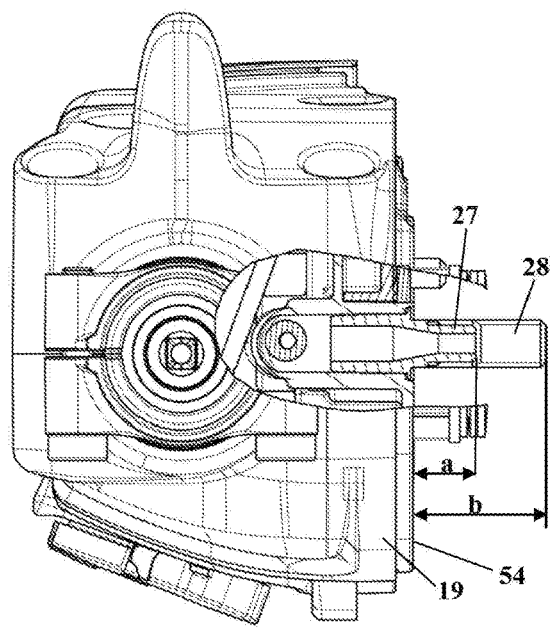
FIG. 15 is a partially sectioned side view in the direction of arrow XV of FIG. 14.

As shown in FIG. 15, the first guide bolt 27 is significantly shorter than the second guide bolt 28. The first guide bolt 27 has a free length a which is projecting from the gear housing 19. The second guide bolt 28 has a free length b which is projecting from the gear housing 19; the length b is significantly greater than the free length a. The free length b can be approximately 1.5 times to 3 times the free length a. The free lengths a and b in the embodiment are measured relative to the support surface 54. In the embodiment, the guide bolt 27 forms an extension. The free length a of the extension is advantageously greater than the spacing c (illustrated in FIG. 11) between the planes 68 and 69. The spacing c corresponds advantageously to the thickness of the guide bar 17. Advantageously, the free length a is greater than the spacing c (FIG. 11) at least by the length of the seal 64, i.e., the sealing surface (FIG. 6), that is measured in the direction of the longitudinal axis 80. The free length b of the second guide bolt 28 is advantageously dimensioned such that the second guide bolt 28 projects completely through the sprocket wheel cover 20 to the exterior side 65 of the sprocket wheel cover 20 (FIG. 9) so that the fastening nut 21 can be secured well on the fastening bolt 28.

Figure 16:
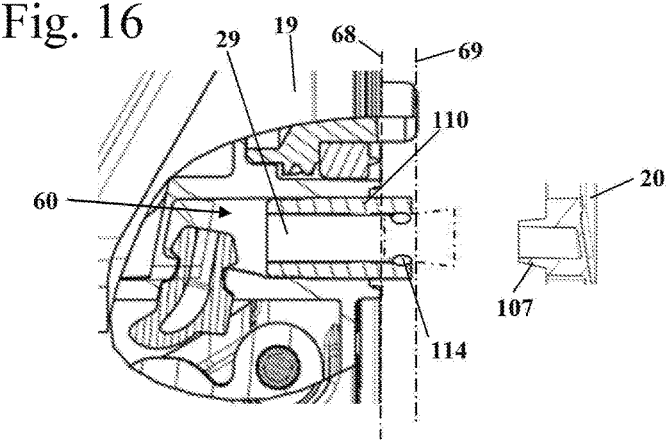
FIG. 16 is a schematic detail section illustration of an embodiment of the channel section.

In FIG. 16, an embodiment of gear housing 19 and sprocket wheel cover 20 is illustrated which substantially corresponds to the embodiment illustrated in the preceding Figures. Same reference characters designate in all Figures elements that correspond to each other. In the embodiment according to FIG. 16, on the gear housing 19 a sleeve 110 is secured. On the sprocket wheel cover 20, which is illustrated in the schematic illustration of FIG. 16 at a spacing to the gear housing 19, an extension 107 is arranged. In the embodiment, the extension 107 is configured as one piece together with the sprocket wheel cover 20. The extension 107 is advantageously integrally molded by injection molding on the sprocket wheel cover 20. The sleeve 110 serves for receiving the extension 107, as illustrated in FIG. 16 by dash-dotted line. The channel section 29 of the oil supply channel 60 is extending through the sleeve 110 and the extension 107. Between the sleeve 110 and the extension 107, a seal 114 is arranged and is schematically indicated in FIG. 16; the seal 114 is formed as a separate sealing element. The seal 114 can however also be formed by a sealing surface where the extension 107 and the sleeve 114 are contacting each other. As shown in FIG. 16, the seal 114 is arranged between the planes 68 and 69. When the guide bar 17 is mounted, the seal 114 is thus positioned between the exterior sides 58 and 59 of the guide bar 17 (FIG. 11). The seal 114 is resting against the exterior circumference of the extension 107 and against the inner circumference of the sleeve 110.

Figure 17:
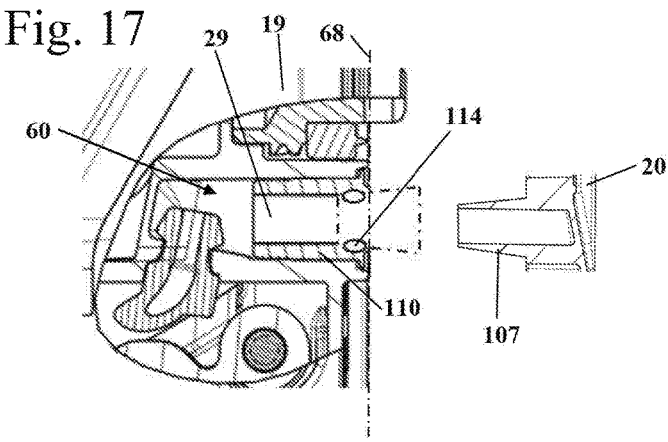
FIG. 17 is a schematic detail section illustration of another embodiment of the channel section.

In the further embodiment illustrated in FIG. 17, an extension 107 formed on the sprocket wheel cover 20 projects past the plane 68 into the gear housing 19. The seal 114 is arranged in the gear housing 19, i.e., on the side of the plane 68 which is facing away from the plane 69. In a further alternative embodiment, it may also be provided that the sleeve 110 is extending on the side of the plane 69 which is facing away from the gear housing 19. In particular, the seal 114 is arranged on the side of the plane 69 which is facing away from the gear housing 19.

Figure 18:
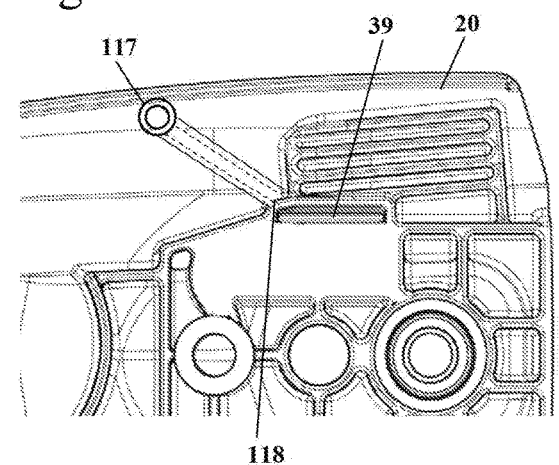
FIG. 18 is a schematic partially sectioned illustration of an embodiment of a sprocket wheel cover.
Figure 19:
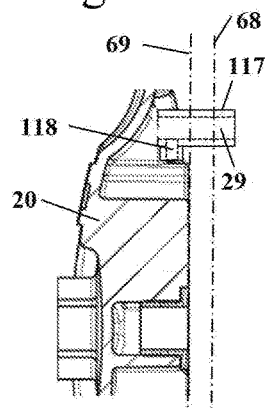
FIG. 19 is a schematic section illustration of the sprocket wheel cover of FIG. 18.

FIGS. 18 to 21 show a further alternative embodiment. An extension 117 is arranged on the sprocket wheel cover 20, as shown in FIGS. 18 and 19. The position of the extension 117 is only schematically indicated in FIG. 19. The extension 117 is arranged in a rim area of the gear housing 19 outside of the area in which the guide bar 17 (FIG. 7) is resting against the gear housing 19. The extension 117 can be designed as a separate component or can be integrally formed on the sprocket wheel cover 20 and is connected by a channel 118 with the oil supply slot 39. The extension 117 extends in this context to the side of the plane 68 which is facing away from the sprocket wheel cover 20.

Figure 20:
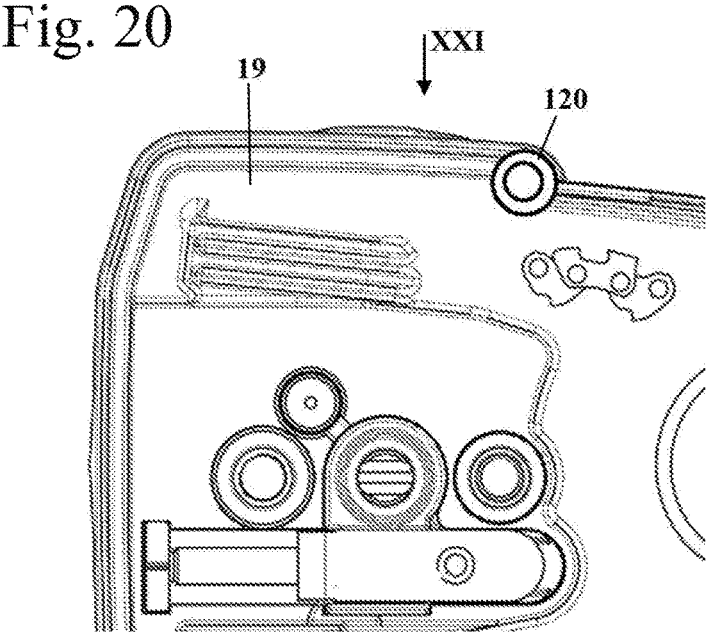
FIG. 20 is a schematic side view of an embodiment of a gear housing for the sprocket wheel cover illustrated in FIGS. 18 and 19.
Figure 21:
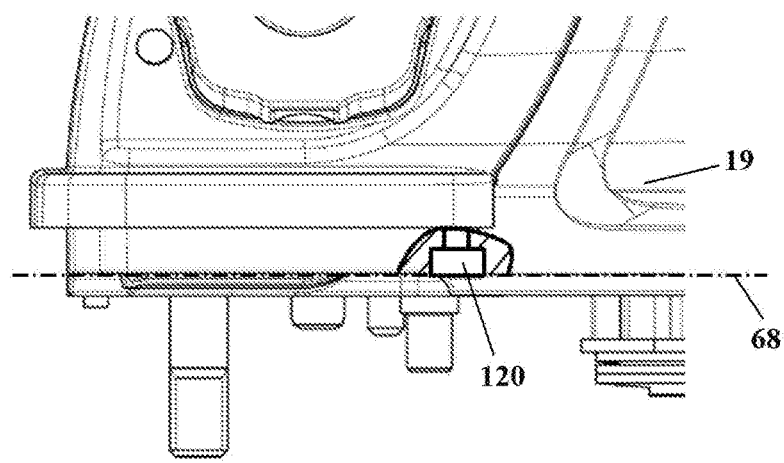
FIG. 21 is a schematic partially sectioned side view in the direction of arrow XXI of FIG. 20.

As indicated in FIGS. 20 and 21, in the gear housing 19, in the area that is opposite the extension 117, a receptacle 120 is arranged which is formed as a recess in the gear housing 19 and into which the extension 117 is projecting when the sprocket wheel cover 20 is secured on the gear housing 19. The position of the extension 117 and the position of the receptacle 120 are illustrated only schematically in FIGS. 18 to 21. The extension 117 and the receptacle 120 are advantageously arranged in an area which is outside of the guide bar 17 and has no contact to the saw chain 18 (FIG. 1). The seal between extension 117 and sprocket wheel cover 20 is advantageously arranged on the side of the plane 68 which is facing the gear housing 19 and can be designed as described in any of the preceding embodiments. However, it can also be advantageous that the seal is arranged between the planes 68 and 69 or on the side of the plane 69 which is facing away from the plane 68. Instead of the recess in the gear housing 19, an extension of appropriate length is then provided on the gear housing 19 and projects into a corresponding receptacle on the sprocket wheel cover 20. The length of the extension is advantageously matched suitably.

The illustrated embodiments can be combined in any suitable way with each other in order to obtain advantageous configurations. Configurations of the embodiments according to FIGS. 16 to 21 which are not explained in more detail are advantageously embodied as disclosed in connection with the embodiments of FIGS. 1 through 15.

The specification incorporates by reference the entire disclosure of German priority document 10 2016 000 718.4 having a filing date of Jan. 23, 2016.

While specific embodiments of the invention have been shown and described in detail to illustrate the inventive principles, it will be understood that the invention may be embodied otherwise without departing from such principles.

What is claimed is:

1. A hand-guided power tool comprising:
a housing;
a sprocket wheel cover mounted on the housing;
an oil supply device;
a guide bar secured between the housing and the sprocket wheel cover;
the guide bar comprising a guide groove for a saw chain;
the guide bar comprising a guide slot extending in a direction of a longitudinal center axis of the guide bar and configured to guide the guide bar on a first guide element for slidable movement of the guide bar relative to the housing in a longitudinal direction of the guide bar;
the guide bar comprising a first exterior side facing the housing and a second exterior side facing the sprocket wheel cover, wherein the first exterior side is positioned in a first plane and wherein the second exterior side is positioned in a second plane;
the guide bar comprising an oil supply opening extending from the second exterior side into the guide groove, wherein the oil supply opening is fluidically connected by an oil supply channel with the oil supply device, and wherein the oil supply channel comprises a channel section arranged stationarily relative to the housing, wherein the channel section is configured as a part separate from the guide bar such that the channel section does not move relative to the housing when the guide bar is moved relative to the housing, and wherein the channel section extends at least from the first plane to the second plane.

2. The power tool according to claim 1, wherein the longitudinal center axis of the guide bar intersects the channel section.

3. The power tool according to claim 1, wherein the channel section extends through the guide slot.

4. The power tool according to claim 1, further comprising a second guide element configured as a guide bolt comprising an outer thread for screwing on a fastening nut for fixation of the sprocket wheel cover on the housing.

5. The power tool according to claim 1, wherein the power tool is a pole pruner and the housing is a gear housing.

6. A hand-guided power tool comprising:
a housing;
a sprocket wheel cover mounted on the housing;
an oil supply device;
a guide bar secured between the housing and the sprocket wheel cover;
the guide bar comprising a guide groove for a saw chain;
the guide bar comprising a guide slot extending in a direction of a longitudinal center axis of the guide bar and configured to guide the guide bar on a first guide element for slidable movement of the guide bar relative to the housing in a longitudinal direction of the guide bar;
the guide bar comprising a first exterior side facing the housing and a second exterior side facing the sprocket wheel cover, wherein the first exterior side is positioned in a first plane and wherein the second exterior side is positioned in a second plane;
the guide bar comprising an oil supply opening extending from the second exterior side into the guide groove, wherein the oil supply opening is fluidically connected by an oil supply channel with the oil supply device, and wherein the oil supply channel comprises a channel section, wherein the channel section is configured as a part separate from the guide bar and extends at least from the first plane to the second plane;
wherein the oil supply channel comprises a receptacle and wherein the channel section of the oil supply channel is embodied at least partially by an extension that projects into the receptacle, wherein the extension is pulled out of the receptacle when the sprocket wheel cover is removed from the housing, and wherein the extension and the receptacle are sealed relative to each other by a seal.

7. The power tool according to claim 6, wherein the seal is arranged on a circumference of the extension.

8. The power tool according to claim 6, wherein, when the guide bar is longitudinally moved relative to the housing, the seal is stationarily arranged relative to the housing.

9. The power tool according to claim 6, wherein the seal is arranged in an area between the second plane and an exterior side of the sprocket wheel cover facing away from the housing.

10. The power tool according to claim 6, wherein the receptacle is a sleeve.

11. The power tool according to claim 6, wherein the extension is formed by the first guide element and wherein the channel section is designed as a through opening in the first guide element.

12. A hand-guided power tool comprising:
a housing;
a sprocket wheel cover mounted on the housing;
an oil supply device;
a guide bar secured between the housing and the sprocket wheel cover;
the guide bar comprising a guide groove for a saw chain;
the guide bar comprising a guide slot extending in a direction of a longitudinal center axis of the guide bar and configured to guide the guide bar on a first guide element for slidable movement of the guide bar relative to the housing in a longitudinal direction of the guide bar;
the guide bar comprising a first exterior side facing the housing and a second exterior side facing the sprocket wheel cover, wherein the first exterior side is positioned in a first plane and wherein the second exterior side is positioned in a second plane;
the guide bar comprising an oil supply opening extending from the second exterior side into the guide groove, wherein the oil supply opening is fluidically connected by an oil supply channel with the oil supply device, and wherein the oil supply channel comprises a channel section, wherein the channel section is configured as a part separate from the guide bar and extends at least from the first plane to the second plane;
wherein the sprocket wheel cover comprises an oil supply slot arranged opposite the oil supply opening of the guide bar.

13. The power tool according to claim 12, wherein the channel section is connected by a connecting channel to the oil supply slot, wherein the connecting channel is open relative to a guide bar contact surface of the sprocket wheel cover.

14. The power tool according to claim 12, further comprising a tensioning device, wherein the guide bar has a transverse plane which contains the longitudinal center axis of the guide bar and which extends perpendicular to the first and second exterior sides of the guide bar, and wherein the oil supply slot and the tensioning device are arranged on opposite sides of the transverse plane.

* * * * *